(12) United States Patent
Mäkelä

(10) Patent No.: US 6,813,143 B2
(45) Date of Patent: Nov. 2, 2004

(54) MOBILE DEVICE FEATURING 90 DEGREE ROTATABLE FRONT COVER FOR COVERING OR REVEALING A KEYBOARD

(75) Inventor: Aarre Mäkelä, Halikko (FI)

(73) Assignee: Nokia Corporation, Espoo (FI)

( * ) Notice: Subject to any disclaimer, the term of this patent is extended or adjusted under 35 U.S.C. 154(b) by 16 days.

(21) Appl. No.: 10/278,048

(22) Filed: Oct. 21, 2002

(65) Prior Publication Data

US 2004/0075973 A1 Apr. 22, 2004

(51) Int. Cl.$^7$ .................................................. G06F 1/16
(52) U.S. Cl. ...................... 361/679; 361/680; 361/681; 361/683
(58) Field of Search ............................... 361/679–681, 361/683, 686

(56) References Cited

U.S. PATENT DOCUMENTS

| | | | | |
|---|---|---|---|---|
| 5,278,779 A | * | 1/1994 | Conway et al. | 361/680 |
| 5,390,075 A | * | 2/1995 | English et al. | 361/683 |
| 6,009,336 A | * | 12/1999 | Harris et al. | 455/566 |
| 6,304,430 B1 | * | 10/2001 | Laine et al. | 361/625 |
| 6,658,272 B1 | * | 12/2003 | Lenchik et al. | 345/164 |
| 6,665,173 B2 | * | 12/2003 | Brandenberg et al. | 361/680 |

FOREIGN PATENT DOCUMENTS

WO     WO 01/77786 A2     10/2001

OTHER PUBLICATIONS

Danger, Inc., "hiptop", (brochure), Palo Alto, California, (circa 2001).

* cited by examiner

*Primary Examiner*—Yean-Hsi Chang
(74) *Attorney, Agent, or Firm*—Ware, Fressola, Van Der Sluys & Adolphson LLP

(57) ABSTRACT

A mobile device has a housing having a keyboard, a front cover having a display and at least one corner, and a hingeable mounting assembly for rotatably coupling the front cover to the housing for covering or revealing entirely the keyboard. The hingeable mounting assembly couples the at least one corner of the front cover to the housing so that the front cover can be turned 90 degrees to cover or reveal the keyboard. The mobile device includes a connection for providing signals between the housing and the front cover. The connection may be an electrical connection and may include flex technology. The front cover may include soft keys, display function keys, an earpiece or a combination thereof.

5 Claims, 2 Drawing Sheets

(Display Revealed Position)

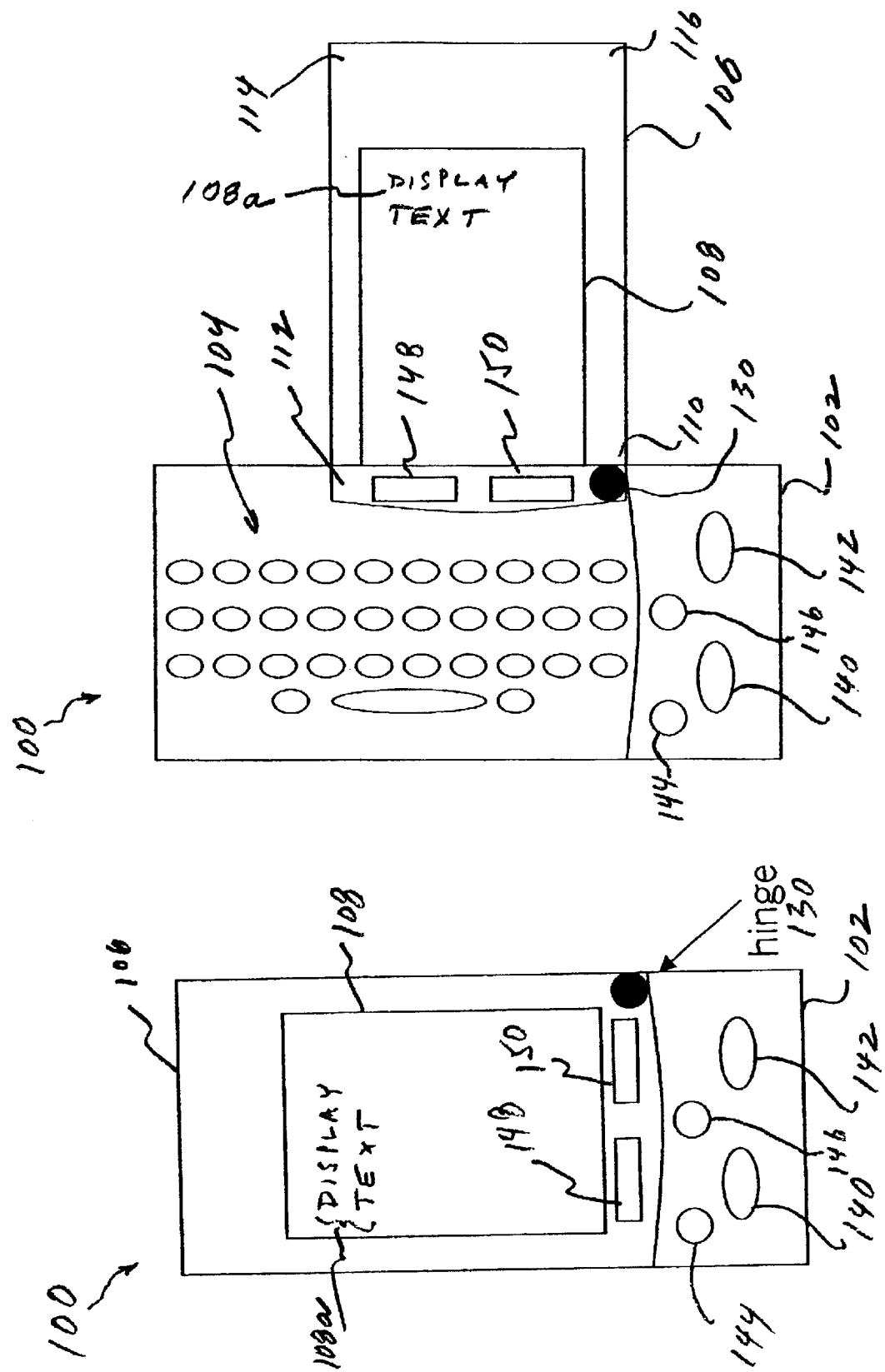

MOBILE DEVICE FEATURING 90 DEGREE ROTATABLE FRONT COVER FOR COVERING OR REVEALING A KEYBOARD

BACKGROUND OF THE INVENTION

1. Field of Invention

The present invention relates to a mobile device; and more particularly relates to a mobile device with a rotatable front cover to cover or reveal a display.

2. Description of Related Art

FIG. 1 shows a known mobile device 10 that has a housing 12 having a keyboard generally indicated as 14, a front cover 16 having a display 18, two corners 20, 22 and a side 24 inbetween the two corners 20, 22, and a hingeable mounting assembly 26 for rotatably coupling the front cover 16 to the housing 12 for covering or revealing the keyboard 18. The hingeable mounting assembly 26 couples the front cover 16 to the housing 12 along the side 24 and symmetrically inbetween the two corners 20, 22 so that the front cover 16 has to be turned 180 degrees to cover or reveal the keyboard 12. The known mobile device is disclosed in WO 01/77786 A2, entitled "Adjustable Data Processing Display." Another example of this mobile device is shown in a brochure under the name "Hiptop", distributed by a company named Danger, Inc. in Palo Alto, Calif.

This 180 degree rotatable cover design of the mobile device 10 in FIG. 1 has many disadvantages. For example, the known mobile device is not easily opened and closed with one hand. Instead, the mobile device 10 would appear to require two hands to open and close the device, one hand to hold the housing, and the other hand to rotate the front cover 180 degree to cover or reveal the keyboard. Moreover, after the front cover of the known mobile device is rotated 180 degrees, any text 18a on the display would appear to be rotated upside down in relation to the orientation of the keyboard so the user may not have access to a properly oriented keyboard to create a message. In view of this, the mobile device 10 appears to need special text orienting circuitry or software to account for the correct orientation of the display text in relation to the keyboard depending on when the keyboard to covered to revealed, which is likely to increase the overall cost of the device. Moreover still, when opening and closing the mobile device 10, a user does not know which way to turn the front cover 16 in relation to the housing 12 to cover or reveal the keyboard, i.e. clockwise or counterclockwise. This is particularly important when signal connections between the housing and front cover pass through the hingeable mounting assembly. If the front cover 16 may be continuously rotated in one direction 30 or the other, over and over again, then special, and likely more expensive, signal connections appear likely to be needed to take into account for this possibility.

Other known approaches have the keyboard available all the time or mechanisms that require different user interface layouts (and/or square displays) while the keypad is used.

SUMMARY OF INVENTION

In its broadest sense, the present invention provides a new and unique mobile device including a housing having a keyboard, a front cover having a display and one or more corners, and a hingeable mounting assembly for rotatably coupling the front cover to the housing about an axis substantially perpendicular to planes of respective faces of the keyboard and the display for covering or revealing the keyboard. The hingeable mounting assembly couples one corner of the front cover to the housing so that the front cover can be turned 90 degrees to cover or reveal entirely the keyboard.

The mobile device includes a connection for providing signals between the housing and the front cover. The connection may be an electrical connection and may include flex technology. The front cover may include soft keys, display function keys, or a combination thereof.

This design has many advantages over the known mobile device. For example, the mobile device of the present invention is easily opened and closed with one hand. From a closed position, one hand may hold the housing, while the thumb of the hand rotates the front cover 90 degree to reveal the keyboard. From an open position, one hand may hold the housing and the display may be pressed closed against the body, a table, etc. Moreover, after the front cover of the known mobile device is rotated 90 degrees, any text on the display will appear to be correctly in relation to the orientation of the keyboard. In view of this, the known mobile device does not need to contain special circuitry to correct the orientation of the text in relation to the keyboard. Moreover still, when opening and closing the device, the user knows which way to rotate the front cover in relation to the housing to cover or reveal the keyboard, i.e. clockwise or counterclockwise. In view of this flex technology may be used for signal connections that are passed through the hingeable mounting assembly. The front cover is not likely to be continuously rotated in the same direction over and over again.

BRIEF DESCRIPTION OF THE DRAWING

The drawing, not drawn to scale, includes the following Figures:

FIGS. 2–3 are block diagrams of a mobile device that is the subject matter of the present invention.

DETAILED DESCRIPTION OF INVENTION

Figure 1:
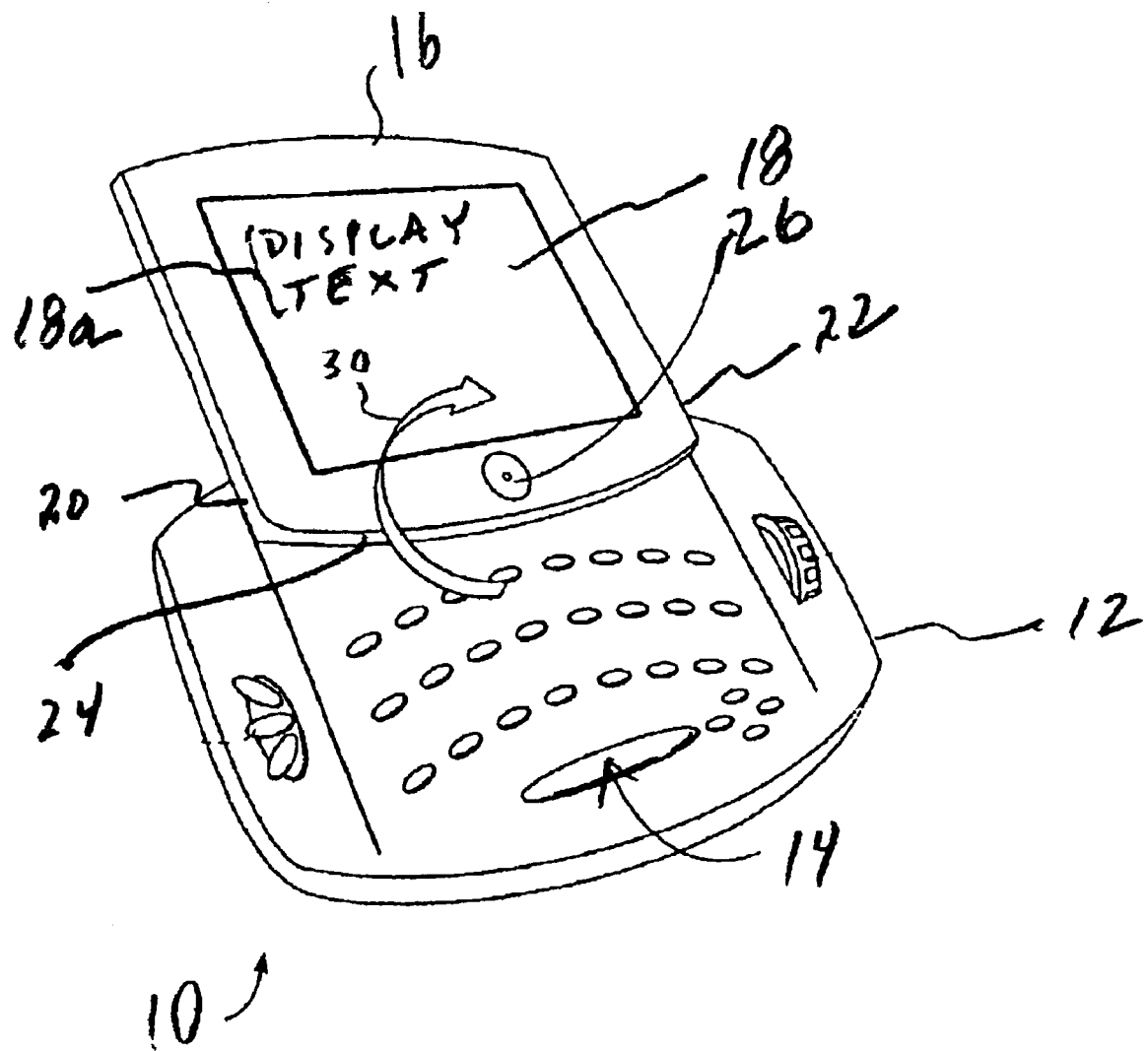
FIG. 1 is a diagram of a known mobile device having a 180 degree rotatable front cover.

FIGS. 2–3 show a mobile device generally indicated as 100 comprising a housing 102 having a keyboard 104, a front cover 106 having a display 108 and one or more corners 110, 112, 114, 116, and a hingeable mounting assembly generally indicated as 130 for rotatably coupling the front cover 106 to the housing 102 about an axis substantially perpendicular to planes of respective faces of the keyboard 104 and the display 108 for covering or revealing the keyboard 104. As shown, the hingeable mounting assembly 130 couples the corner 110 of the front cover 106 to the housing 102 so that the front cover 106 can be turned 90 degrees to cover or reveal entirely the keyboard 104. After the front cover 106 is rotated 90 degrees as shown in FIG. 3, the display text 108a will appear correctly in relation to the orientation of the keyboard 102.

The mobile device 100 includes a connection or coupling for providing signals between the housing 102 and the front cover 106. The connection may be an electrical connection and may include flex technology, which is known in the art. There are many other different types of known connections or couplings for providing signals between the housing 102 and the front cover 106; and the scope of the invention is not intended to be limited to any particular type or kind thereof.

The front cover 106 may include other components such as 148, 150, which may be soft keys, display function keys, or some combination thereof. The scope of the invention is not intended to be limited to the number, type or functionality of these other components on the front cover 106.

The keyboard 104 may be a QWERTY type keyboard or any other type of keyboard known now or developed in the future. The scope of the invention is not intended to be limited to the type or functionality of the keyboard 106.

The mobile device 100 also has other function keys 140, 142, 144, 146, which may include a send key, an end key, a first display function key and a second display function key 146. The scope of the invention is not intended to be limited to the number, type or functionality of these function keys.

The corner 110 is shown at a point where two sides of the front cover 106 meet and is also shown to be substantially 90 degrees. However, the scope of the invention is not intended to be limited to the corner 110 being substantially shaped squarely. Embodiments of the invention are envisioned in which the corner 110 is substantially rounded in shape, as well as other geometric shapes.

A mounting assembly such as 130 for hinging or rotating one part of a device 90 degrees in relation to another part of a device is known in the art, and the scope of the invention is not intended to be limited to any particular type or kind thereof.

SCOPE OF THE INVENTION

Accordingly, the invention comprises the features of construction, combination of elements, and arrangement of parts which will be exemplified in the construction hereinafter set forth.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

I claim:

1. A mobile device comprising a housing having a keyboard, a front cover having a display and one or more corners, and a hingeable mounting assembly for rotatably coupling the front cover to the housing about an axis substantially perpendicular to planes of respective faces of the keyboard and the display for covering or revealing the keyboard, characterized in that the hingeable mounting assembly couples one corner of the front cover to the housing so that the front cover can be turned 90 degrees to cover or reveal entirely the keyboard.

2. A mobile device according to claim 1, characterized in that the mobile device includes a connection for providing signals between the housing and the front cover.

3. A mobile device according to claim 2, characterized in that the connection is an electrical connection.

4. A mobile device according to claim 3, characterized in that the electrical connection includes flex technology.

5. A mobile device according to claim 1, characterized in that the front cover includes soft keys, display function keys, an earpiece, or a combination thereof.

* * * * *